United States Patent
Jensen

(10) Patent No.: US 9,404,830 B2
(45) Date of Patent: Aug. 2, 2016

(54) NACELLE TEST APPARATUS

(71) Applicant: Jens Bomholt Jensen, Horsens (DK)

(72) Inventor: Jens Bomholt Jensen, Horsens (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 310 days.

(21) Appl. No.: 13/898,582

(22) Filed: May 21, 2013

(65) Prior Publication Data

US 2013/0333478 A1    Dec. 19, 2013

(30) Foreign Application Priority Data

Jun. 14, 2012   (EP) ..................................... 12172024

(51) Int. Cl.
    *G01M 7/02*   (2006.01)
    *F03D 11/00*  (2006.01)
    *G01M 7/06*   (2006.01)

(52) U.S. Cl.
    CPC ............. *G01M 7/02* (2013.01); *F03D 11/0091* (2013.01); *G01M 7/027* (2013.01); *G01M 7/06* (2013.01); *F05B 2260/83* (2013.01); *Y02E 10/722* (2013.01)

(58) Field of Classification Search
    CPC ....... F03D 1/003; F03D 11/0091; F03D 9/00;
         G01M 7/02; G01M 7/06; G01M 7/027;
         G01L 3/10; G01R 31/346; F05B 2260/83;
                                      Y02E 10/722
    USPC .................................. 73/662, 663, 666, 865.8
    See application file for complete search history.

(56) References Cited

U.S. PATENT DOCUMENTS

| 4,457,165 A | * | 7/1984 | Wiederrich | ........... G01L 5/0095 73/115.05 |
| 7,150,090 B2 | * | 12/2006 | Dorsey | ............... H02K 15/0006 29/596 |
| 2005/0172729 A1 | * | 8/2005 | Gonzalez | ................ F03D 11/00 73/856 |
| 2006/0037402 A1 | * | 2/2006 | Musial et al. | .................... 73/664 |
| 2009/0107255 A1 | * | 4/2009 | Jensen | ........................... 73/862 |
| 2011/0041617 A1 | * | 2/2011 | Cotrell | ................ F03D 11/0091 73/660 |

(Continued)

FOREIGN PATENT DOCUMENTS

| CN | 101464213 B | * | 9/2010 | ............ G01M 9/062 |
| DE | 102010017456 A1 | | 12/2011 | |

(Continued)

*Primary Examiner* — John Fitzgerald
*Assistant Examiner* — Suman K Nath

(57) ABSTRACT

A nacelle test apparatus for testing a wind turbine nacelle is provided. The test apparatus includes a physical tower model apparatus realized to model the behavior of a wind turbine tower and/or a physical rotor model apparatus realized to model the behavior of a wind turbine rotor, and an exciter apparatus for exciting a physical model apparatus. Also provided is a method of testing a wind turbine nacelle, which method includes mounting the nacelle onto a physical tower model apparatus of a nacelle test apparatus, which physical tower model apparatus is realized to model the behavior of a wind turbine tower, and/or mounting a physical rotor model apparatus of the nacelle test apparatus to a hub of the nacelle, which physical rotor model apparatus is realized to model the behavior of a wind turbine rotor, and exciting the physical tower model apparatus and/or the physical rotor model apparatus.

19 Claims, 5 Drawing Sheets

(56) References Cited

U.S. PATENT DOCUMENTS

| | | | |
|---|---|---|---|
| 2011/0187103 A1* | 8/2011 | Yasuga | H02P 9/007 290/44 |
| 2012/0104756 A1* | 5/2012 | Beekmann | F03D 7/0224 290/44 |
| 2012/0133148 A1* | 5/2012 | Romeo | 290/55 |
| 2012/0134830 A1* | 5/2012 | Tozzi | F03D 7/0212 416/169 R |
| 2013/0202437 A1* | 8/2013 | Himmelmann | F16H 49/00 416/170 R |
| 2014/0070534 A1* | 3/2014 | Hamano | F03D 11/02 290/43 |

FOREIGN PATENT DOCUMENTS

| | | |
|---|---|---|
| EP | 1564405 A1 | 8/2005 |
| WO | WO 2010066163 A1 | 6/2010 |

\* cited by examiner

NACELLE TEST APPARATUS

CROSS REFERENCE TO RELATED APPLICATIONS

The present application claims priority to European Patent Office application No. 12172024.7 EP filed Jun. 14, 2012, the entire content of which is hereby incorporated herein by reference.

FIELD OF INVENTION

The invention describes a nacelle test apparatus for testing a wind turbine nacelle, and a method of testing a wind turbine nacelle.

BACKGROUND OF INVENTION

A wind turbine generally comprises a generator housed in a nacelle, mounted on top of a tower so that the nacelle is situated relatively high above ground or sea level. A high tower is preferred, since wind speed increases with increasing altitude. Wind turbine towers can exceed 70 m in height. A tower is generally a closed structure to provide structural stability and to afford protection for components arranged in the tower itself, such as electrical systems, cooling arrangements, control equipment, etc. One type of widely used tower construction comprises a number of steel sections connected together and mounted to a foundation. Another type of tower structure is made of concrete, for example reinforced concrete sections stacked one on top of the other, or cast in situ. The nacelle is generally mounted to the top of the tower by means of a yaw ring, so that the nacelle can be moved in order to have the rotor face into the wind. Here, the term "rotor" is to be understood as an arrangement of rotor blades connected to a hub, which in turn is mounted to a rotatable component of the generator such as a shaft or field, depending on the type of generator that is used.

The combined weight of the nacelle, generator and rotor rests on the top of the tower, which is usually simply regarded as a weight-bearing structure. However, regardless of the manner in which the tower was constructed, the tower is not entirely rigid, and can oscillate in any direction of a horizontal plane, for example a horizontal plane through the top of the tower, and the tower can oscillate sideways as a result of the forces acting on it during operation of the wind turbine or as a result of high winds. The vibrations or oscillations can ultimately compromise the structural stability of the wind turbine, since repeated vibration can result in fatigue. Furthermore, vibrations of the nacelle can also manifest as unacceptably loud levels of acoustic noise. The nature and extent of the oscillations are difficult to predict before commencing the actual construction of a wind turbine. Usually, complex simulation programs are used to model various aspects of wind turbine construction, and the results of a software simulation are used to refine various design aspects. However, such software simulations are only of limited use, since the results depend entirely on the accuracy of the modelling input information, and it is simply not possible to exactly model every aspect of a tower, nacelle, generator and rotor under every conceivable operating condition. As a result, when the wind turbine has been constructed and put into operation, it may be observed to perform poorly under certain conditions, with detrimental side effects that cannot be corrected. Particularly in the case of a wind park comprising many wind turbines, for example an offshore wind park, a favourable performance of the wind turbines is of great importance—in all weather conditions and for all levels of power output.

SUMMARY OF INVENTION

It is therefore an object of the invention to provide an improved way of predicting the behaviour of a wind turbine before its construction.

This object is achieved by the nacelle test apparatus of the claims; and by the method of the claims of testing a wind turbine nacelle.

According to the invention, the nacelle test apparatus for testing a wind turbine nacelle comprises a physical tower model apparatus realised to model the behaviour of a wind turbine tower; and/or a physical rotor model apparatus realised to model the behaviour of a wind turbine rotor; and an exciter apparatus for exciting the physical model apparatus.

An advantage of the nacelle test apparatus according to the invention is that it can be used to identify and correct design deficiencies in various components of a wind turbine before actual construction of the wind turbine, so that damage to the nacelle and/or generator can be avoided. The nacelle test apparatus makes it possible to improve the nacelle design from the outset, avoiding costs that would otherwise arise from the detrimental side effects of prolonged vibrations such as material fatigue. Furthermore, the nacelle test apparatus according to the invention can be constructed at any convenient location, for example at the generator or nacelle manufacturing site. Furthermore, the behaviour of a tower or a rotor can be translated very accurately into compact physical models, so that the test apparatus according to the invention can be realised in an economical manner.

According to the invention, the method of testing a wind turbine nacelle comprises mounting the nacelle onto a physical tower model apparatus, which physical tower model apparatus is realised to model the behaviour of a wind turbine tower; and/or mounting a physical rotor model apparatus to a hub of the nacelle, which physical rotor model apparatus is realised to model the behaviour of a number of wind turbine blades; and exciting the physical tower model apparatus and/or the physical rotor model apparatus.

An advantage of the method according to the invention is that the testing can be carried out very conveniently, without first having to transport a nacelle to an already constructed tower. Results of the test procedures can be conveniently analysed on site, and corrective measures can be quickly carried out and re-tested, so that a nacelle design can be optimised even before construction of a wind turbine. The method therefore can contribute to a reduction in the costs of a wind turbine, which savings become even more significant if a wind park with many wind turbines is to be constructed. The method according to the invention can also be used to trouble-shoot an existing wind turbine design, by using the same nacelle type and carrying out a test procedure to reproduce an already observed problem and to identify its cause. In this way, existing designs can be corrected or improved.

Particularly advantageous embodiments and features of the invention are given by the dependent claims, as revealed in the following description. Features of different claim categories may be combined as appropriate to give further embodiments not described herein.

In the following, but without restricting the invention in any way, the term "wind turbine rotor" is to be understood to mean the wind turbine blades mounted to a spinner or hub, since these are collectively caused to rotate by the wind. The rotation of the spinner is transferred either to a shaft or to a field arrangement of the generator, depending on the generator design.

The nacelle test apparatus can be realised to model various constructional and behavioural aspects of a wind turbine. A wind turbine tower can be regarded as a "long spring" with the same length as the tower and bearing the weight of the nacelle, generator, and rotor. For example, an 80 m tower can be regarded as a long spring with a length of 80 m or so. The invention makes use of the fact that a suitable constellation of "short springs" can provide an equivalent model for a long spring. Therefore, in a particularly preferred embodiment of the invention, the physical tower model apparatus comprises an arrangement of spring elements chosen to mimic spring characteristics of a wind turbine tower. A physical model of the long spring can therefore be constructed. The test apparatus (or "test rig" in the following) preferably comprises a tower exciter apparatus realised to excite the spring element arrangement in order to mimic the physical behaviour of the tower itself.

In a preferred embodiment of the invention, the spring element arrangement comprises a plurality of upright spring elements in a suitable constellation. For example, it may be determined that a long spring can be modelled by several hundred short springs arranged in a circular constellation corresponding to the circular cross-section of the upper level of the tower.

In a vertical direction, a wind turbine tower will exhibit essentially no movement, whereas an upper region of the tower can sway or vibrate sideways to a significant extent. To predict the performance of the tower in real life, this behaviour should be considered by any tower model. Therefore, in a further preferred embodiment of the invention, a spring element is realised to comprise a low stiffness in a horizontal direction and a high stiffness in a vertical direction, whereby the "vertical" direction corresponds to the vertical orientation of the tower, and the "horizontal" direction relates to a horizontal plane of oscillation of the tower, as indicated in the introduction.

A wind turbine tower may also twist slightly about its vertical axis on account of the loading, whereby the amount of torsional movement or "twist" will be greatest at the highest point of the tower, i.e. the level at which the nacelle is mounted to the tower. Therefore, in a further preferred embodiment of the invention, the spring element is preferably realised so that it can model the torsional movement of a tower. To this end, a spring element can be realised to comprise a high stiffness in a radial direction and a low torsional stiffness in a tangential direction. A set of such spring elements could be arranged in a circular constellation such that a spring element exhibits a low stiffness along a tangent to the circle, and a high stiffness along a radius of the circle.

A spring element can be obtained by using a tension bar, i.e. a bar of metal with dimensions and material properties chosen to obtain the desired spring properties. The tension bar is preferably also realised for mounting securely in a suitable apparatus to which the nacelle can be mounted, and which can be acted upon by the exciter apparatus.

A long spring can then be modelled using many such simple short springs. However, the number of short springs required to reliably model a long tower may be difficult to accommodate in a test rig. Therefore, in a particularly preferred embodiment of the invention, a spring element comprises a bundle of upright plates or tension bars connected together. The invention makes use of the fact that the behaviour of a group of short springs can be modelled accurately by effectively combining them to give a single short spring. Therefore, a circular constellation of several hundred finite element short spring models can be "translated" into an equivalent physical formation of a few tens of short spring elements. Such a spring element can be obtained by using a type of leaf spring e.g. a composite bar comprising layers of flat metal plates of the same size with dimensions and material properties chosen to obtain the desired spring properties. Such a spring element is preferably also realised for mounting securely in a suitable apparatus to which the nacelle can be mounted, and which can be acted upon by the exciter apparatus. For example, the metal plates can be fastened together using bolts and a clamp that is also used to connect the spring element to part of the test apparatus.

The test rig can be realised in a number of ways to simulate the real-life behaviour of a nacelle mounted on top of a tower. In a "rotational mode", in which a rotational movement of the tower top about its own axis should be simulated, the arrangement of the short springs is preferably aligned about the centre of a circle corresponding to the tower's vertical axis, i.e. in a circular constellation as mentioned above. In a "translational mode", in which lateral or sideways displacement of the tower is to be simulated, the short springs can be arranged in a square or rectangular arrangement.

As indicated above, a short spring should be realised so that it can be secured in the test rig, in such a way that the spring element arrangement can be excited by the tower exciter apparatus. Therefore, in a preferred embodiment of the invention, the physical tower model apparatus comprises at least one horizontal plate for connecting to the upright spring elements of the spring element arrangement, and wherein the tower exciter apparatus is realised to apply a lateral force to the horizontal plate. For example, the upright spring elements can be arranged in a square formation about the edges of a square metal plate onto which the nacelle is mounted, and the tower exciter apparatus can be realised to apply an impulse or periodic force to one or more sides of the plate. In this way, a controlled lateral displacement of groups of the spring elements is achieved, and this lateral displacement, mimicking the oscillatory behaviour of the tower, is transferred to the nacelle. Measuring instruments or sensors can be arranged at appropriate locations in or on the nacelle to monitor the effects of the vibrations induced by the test rig.

Preferably, the "tower", i.e. the spring element arrangement, should be excited to realistically mimic the behaviour of a real wind turbine tower. Therefore, in a particularly preferred embodiment of the invention, the tower exciter apparatus is realised to vibrate the physical tower model apparatus at a specific frequency or in a specific frequency range, so that the nacelle, mounted on the test rig, is also caused to vibrate at that frequency or in that frequency range. For example, a physical tower model apparatus modelling an 80 m tower can be caused to vibrate at a frequency between 0.2 Hz and 0.5 Hz, which is a typical frequency range for a tower of that height. However, to speed up the testing so that results can be obtained more quickly, the frequencies can be scaled up by a suitable factor, for example by a factor of 10, which gives frequencies between 2 Hz and 5 Hz for the above typical frequency range.

The nacelle could be mounted or connected to the test rig in any suitable manner. However, since forces from the tower are generally transferred to the nacelle through its yaw ring, i.e. the interface between tower and nacelle, in a preferred embodiment of the invention the physical tower model apparatus comprises a yaw interface realised for connecting the nacelle to the spring element arrangement. In this way, the nacelle can be connected to the test rig in the same manner that it would be connected to a tower in real life, and the vibration loading will be transferred realistically to the nacelle. This allows a very precise observation of the effects of the vibrations during operation of the test rig.

The design of a nacelle is usually adapted to suit the design of the generator that will be used, and the constructional parameters of the tower to which it will be mounted. For example, a large generator will generally require a higher tower with relatively large upper diameter, while a smaller generator can be mounted on a tower with a relatively small upper diameter. A test rig can be constructed to suit a particular tower and nacelle design. However, in a preferred embodiment of the invention, the yaw interface is realised to be adapted to a number of different nacelle designs. For example, the yaw interface can be realised to accommodate circular adapter rings of different diameters and with appropriate arrangements of bolts. The test rig is preferably realised so that an adapter ring can be mounted with relatively little effort, for example by securing it to the upper plate of the spring element arrangement. The yaw ring of a particular nacelle can then simply be lifted onto the appropriate adapter ring already in place on the test rig, and secured as if it were being secured to the top of a tower.

During operation of the wind turbine, the wind exerts a force on the rotor blades, which are usually pitched so that as much energy as possible can be extracted from the wind. As mentioned in the introduction, the wind speed increases with increasing distance from ground or sea level. Particularly in the case of a very large rotor, a rotor plane (i.e. the circular disc described by a rotor blade as it rotates through a full circle) can have a diameter in the order of 120 m or more, the difference in wind speed between an upper region and a lower region of the rotor plane can be considerable. Therefore, the hub is generally not evenly loaded. The uneven loading can have detrimental effect on other components that are directly connected to the hub, for example the rotor housing of a generator with direct-drive transmission, or the shaft and gearbox of a generator with geared transmission. Therefore, in a particularly preferred embodiment of the invention, the physical rotor model apparatus comprises a rotation mass realised for mounting to a hub of the nacelle, and a hub exciter apparatus realised to excite the physical rotor model apparatus. The physical rotor model apparatus preferably comprises a means for simulating the uneven loading of the hub. In a further preferred embodiment of the invention, therefore, the physical rotor model apparatus comprises a rotating mass of a sufficient weight, mounted to the hub so that, when it rotates, an uneven rotating load is exerted on the hub to mimic the performance of the rotor blades during operation of the wind turbine.

A wind turbine is generally constructed at a location with reliable wind patterns, i.e. favourably high wind speeds from a prevailing direction. As a result, the rotor of such a wind turbine mostly faces into the direction of the prevailing winds, and the tower will mostly vibrate according to a specific pattern. Therefore, in a particularly preferred embodiment of the invention, the step of exciting the physical tower model apparatus comprises inducing a vibration of the nacelle in a specific direction. In this way, the loads that will mostly be exerted on the nacelle can be reliably modelled and mimicked.

Of course, the wind direction can change, particularly in turbulent or gusty wind conditions. Therefore, in another preferred embodiment of the invention, the step of exciting the physical tower model apparatus comprises altering the direction of vibration of the nacelle.

Therefore, the tower apparatus exciter of the test rig according to the invention is preferably realised to apply impulse or periodic forces to the spring element arrangement from a number of different directions. For example, the tower apparatus exciter can be realised to be movable. It can be used to apply forces to the spring element arrangement from one side, and then moved around to apply forces to the spring element arrangement from a different side. However, in a particularly preferred embodiment of the invention, the tower apparatus exciter comprises a plurality of exciter elements arranged about the spring element arrangement, so that at any one time, impulse or periodic forces can be applied to the spring element arrangement from a number of different directions. This allows a more realistic excitation of the "tower", and a more precise modelling of its behaviour and the effects on the nacelle.

Generally, when the wind changes direction, this is detected in some way and the yaw drive is actuated to turn the rotor to face into the wind. The tower top oscillations will also alter, for example the oscillations caused by the first wind direction will die down, while oscillations caused by the new wind direction will build up. During and after the yawing procedure, therefore, a nacelle on top of a wind turbine tower will be subject to various oscillations at different directions and different frequencies. In a particularly preferred embodiment of the invention, therefore, the method comprises the step of yawing the nacelle while the spring element arrangement is subject to excitations in a plurality of directions.

The method according to the invention preferably comprises the step of measuring a load exerted on a component in or on the nacelle as a result of an excitation of the physical tower model apparatus and/or the physical rotor model apparatus. The observed results can be interpreted to determine improvements that should be made to the structural design of the tower, the nacelle, the generator, etc., for example whether additional reinforcement or damping is needed at a particular region of the nacelle. Such design corrections can be carried out relatively quickly, and the test rig can used again to determine their effectiveness. The test rig according to the invention can therefore be used to identify and correct design problems before the wind turbine is actually constructed.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention.

In the diagrams, like numbers refer to like objects throughout. Objects in the diagrams are not necessarily drawn to scale.

DETAILED DESCRIPTION OF INVENTION

Figure 1:
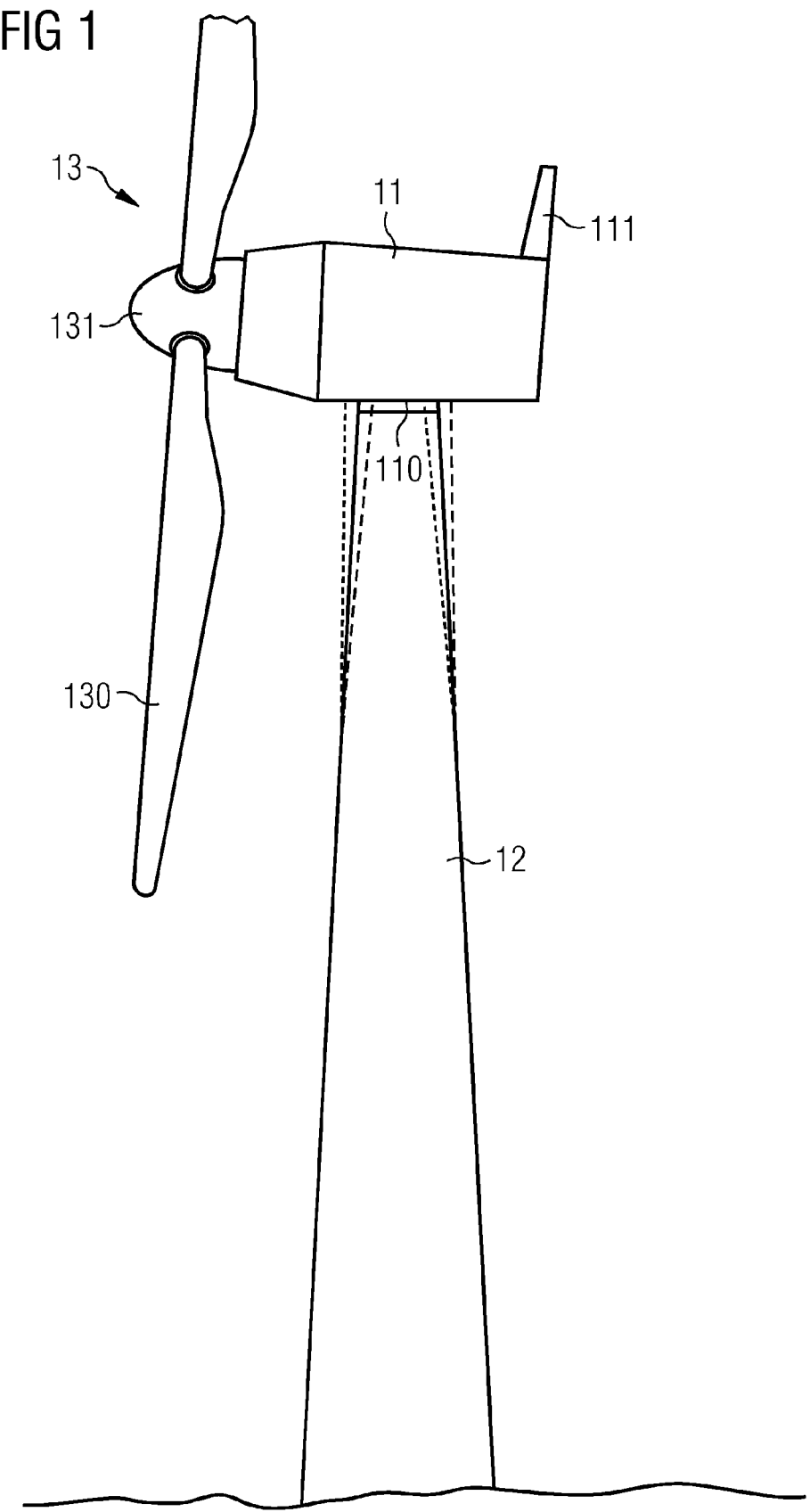
FIG. 1 shows a typical wind turbine construction.

FIG. 1 shows a typical wind turbine construction, with a nacelle 11 mounted on top of a tower 12. The diagram is not to scale, and the tower 12 can be considerably higher than indicated. The nacelle 11 can rotated relative to the tower 12 by means of a yaw ring 110. A cooling arrangement 111 is mounted at the rear of the nacelle 11 to cool the generator components during operation. To extract as much energy as possible out of the wind, the nacelle 11 is turned so that a rotor 13, comprising a number of blades 130 mounted onto a spinner 131 or hub 131, faces directly into the wind. During operation of the wind turbine, the tower 12 sways or oscillates sideways, as indicated—in an exaggerated manner—by the dotted and dashed lines close to the tower top. These oscillations can have a detrimental effect on the structural stability of the wind turbine, since repeated vibrations can result in material fatigue manifesting in various components of the wind turbine.

Figure 2:
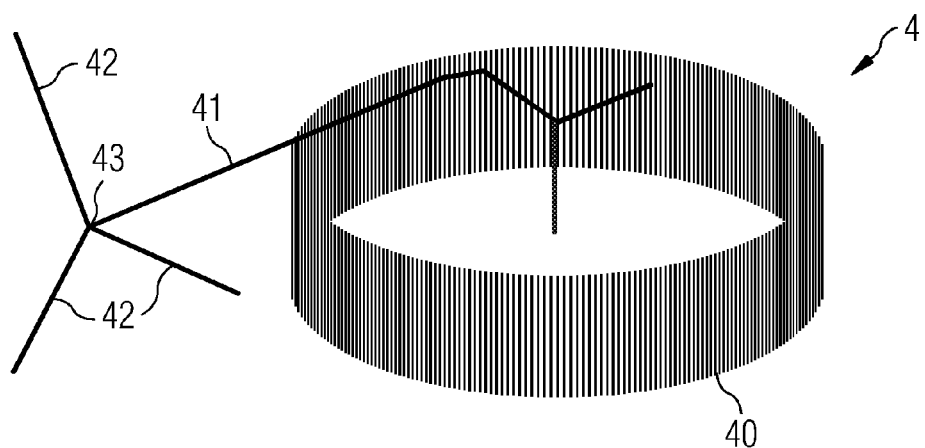
FIG. 2 shows a finite element model of a nacelle test apparatus according to the invention.

FIG. 2 shows a finite element model 4 used to develop the nacelle test apparatus according to the invention. The tower is modelled by a circular formation of short springs 40. The rotor is modelled by a three blade models 42 connected to a hub model 43, which act to "turn" a shaft model 41. This finite element model 4 can provide a favourable close representation of the corresponding "real life" components of the wind turbine. To convert the finite element model 4 into a physical apparatus, the inventors replaced the short springs 40 by a number of physical spring elements to obtain a physical tower model, and replaced the blade and hub models 42, 43 by a rotating mass to obtain a physical rotor model.

Figure 3:
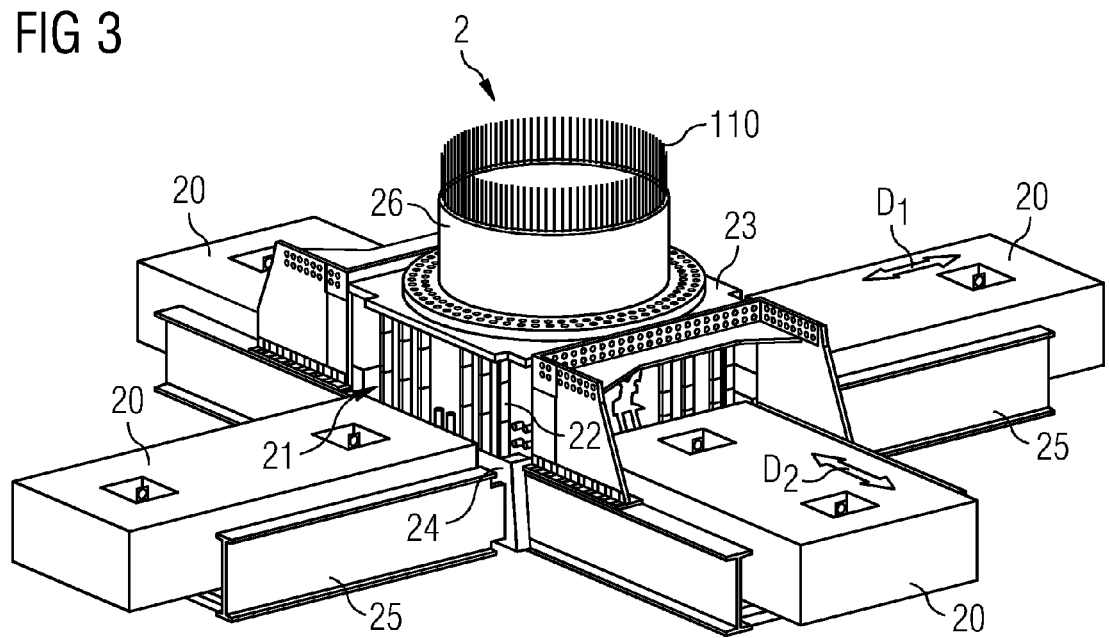
FIG. 3 shows a nacelle test apparatus according to an embodiment of the invention.

An embodiment of a test rig 1 with such a tower model 2 is shown in FIG. 3. The tower model 2 comprises a spring element arrangement 21, which effectively comprises two square horizontal plates 23, 24 between which is mounted a square formation of upright spring elements 22. This embodiment of the test rig 1 can be used to good effect in simulating lateral displacements of the "tower".

The test rig 1 comprises a tower model exciter 20, comprising a number of displacement blocks 20 which can be displaced in defined directions $D_1$, $D_2$ to apply lateral impulse or periodic forces to the horizontal plates 23, 24. A displacement block 20 can be a solid block of a suitable massive material such as concrete and can be moved by a suitably powerful motor (not shown). To this end, the displacement block 20 may be mounted on rails or rollers so that it can be relatively easily displaced in a lateral direction $D_1$, $D_2$.

The test rig 1 also comprises a yaw interface 26 for connecting to a nacelle, and for implementing the yawing function, for example with the usually yaw drive for actuating a yaw ring to turn the nacelle. Here, the yaw interface 26 is realised as a rigid annular component secured to the upper horizontal plate 23. A yaw ring 111 is mounted to the yaw interface 26, so that a nacelle can be lowered into place and secured in the usual manner. The yaw interface 26 can be adapted to receive yaw rings of different diameters so that different nacelles can be tested using this test rig 1. The test rig 1 can be secured firmly to the ground in a foundation 25, so that the vertical stiffness of a wind turbine tower is reliably mimicked even when large forces are exerted by the tower model exciter on the tower model 2. By activating a yaw drive, the nacelle can be made to rotate, so that its position relative to the force directions D1, D2 can be changed.

Figure 4:
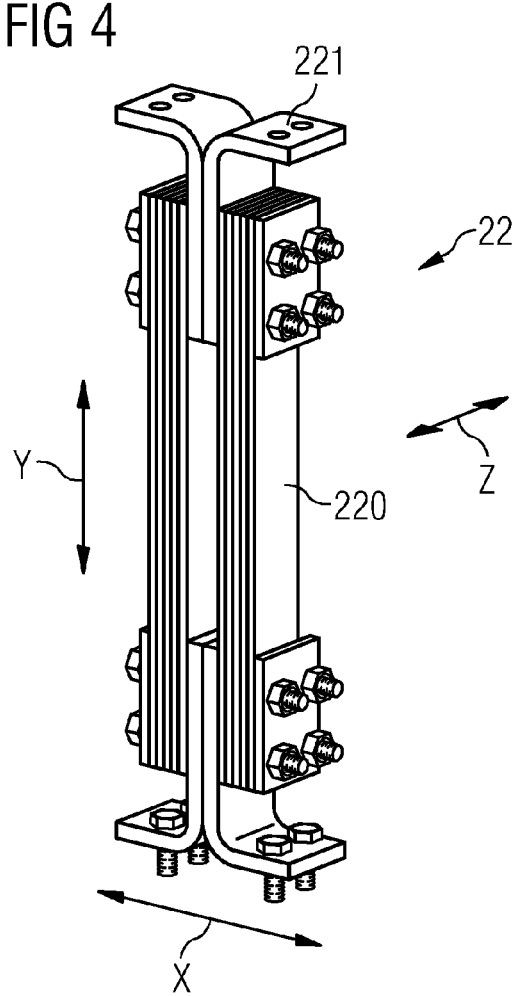
FIG. 4 shows an embodiment of a spring element for use in the nacelle test apparatus of FIG. 3.

The lateral displacement of the top of a wind turbine tower in a translational simulation mode is modelled by the square formation of spring elements 22. Each spring element 22 comprises a number of flat tension bars 220, as shown in FIG. 4. In this example, the tension bars 220 are arranged in two upright groups of five bars 220 on each side, joined together at top and bottom by connecting means 221, which in turn can be bolted to the inside surfaces of the opposing horizontal mounting plates 23, 24 that were described in FIG. 3 above. The combination of the stiff tension bars 220 and the connecting means 221 provide a spring element 22 that is essentially infinitely stiff in the vertical direction Y and a radial direction Z, and flexible to a desired degree only in a specific horizontal direction X. Of course, the number of tension bars 220 that is used will depend on the number of spring elements chosen to represent the finite element short springs that in turn collectively model the "long spring" of the wind turbine tower.

Figure 5:
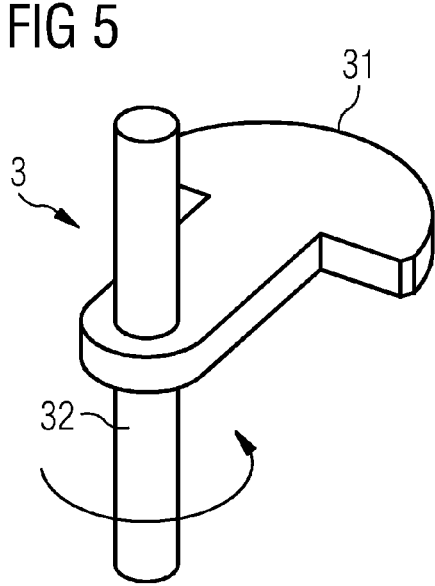
FIG. 5 shows an embodiment of a rotor hub exciter apparatus for use in the nacelle test apparatus of FIG. 3.

FIG. 5 shows a simplified representation of an embodiment of a rotor hub exciter apparatus 3 for use in the test rig 1 of FIG. 3. The rotor hub exciter apparatus 3 need only model the uneven or eccentric loading of the rotor and pass this on to a shaft or field arrangement of the generator, depending on the generator design. To this end, the rotor hub exciter apparatus 3 comprises a mass 31 mounted on a shaft 32. The shaft can be turned by a rotor model exciter so that the mass 31 rotates to simulate the eccentric loading of a "real life" rotor.

Figure 6:
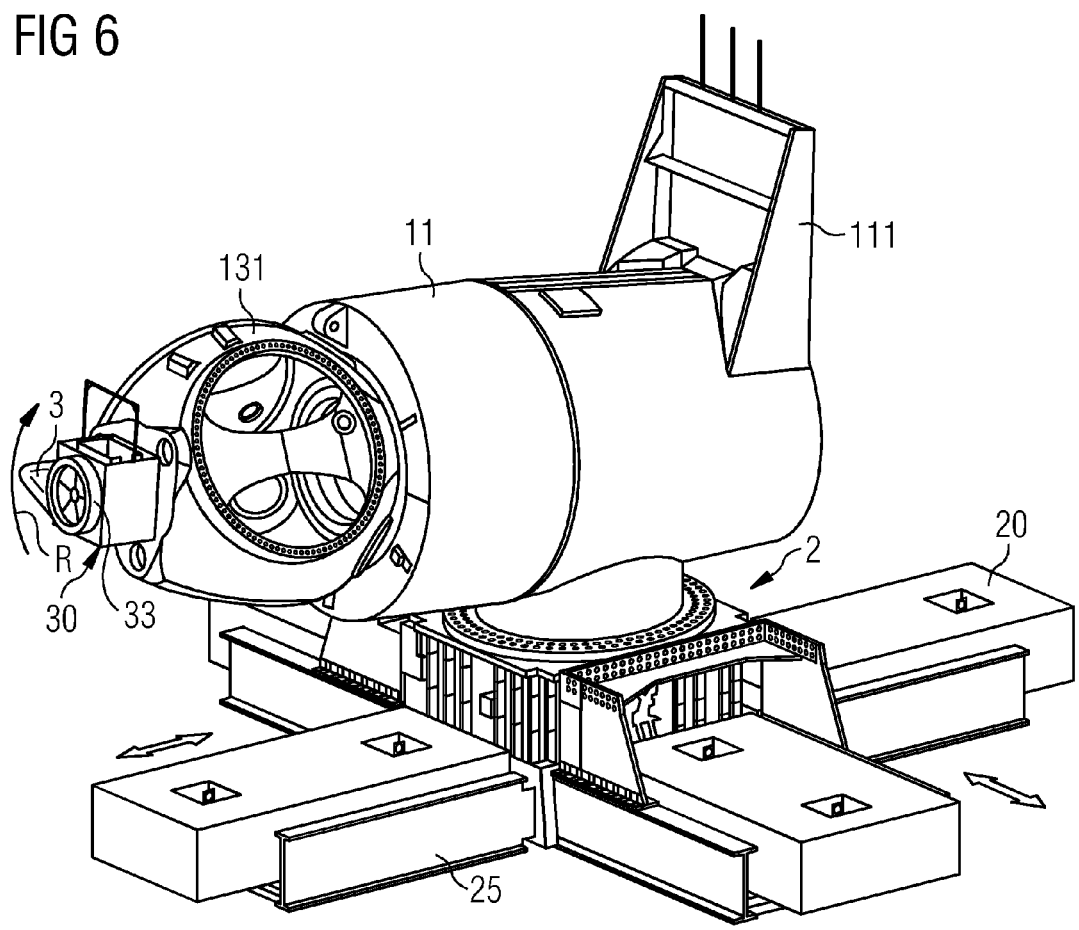
FIG. 6 shows a nacelle mounted on the nacelle test apparatus of FIG. 3.

FIG. 6 shows a nacelle 11 mounted on the nacelle test apparatus 1 of FIG. 3. The test rig 1 is firmly secured in a foundation 25, so that only the lateral displacement of the "tower" 2 or tower model apparatus 2 is transferred to the nacelle when the tower model exciter 20 is activated. A "rotor" 3 or rotor model apparatus 3 is mounted to the spinner 131, and a rotor model exciter 30 causes a mass to rotate in an eccentric manner about a central shaft in the direction R shown, in this case using a drive belt 33, thus simulating the presence of a set of rotor blades in motion. During testing, a yaw drive of the nacelle 11 can be activated to yaw the nacelle 11, while at the same time applying impulse or periodic displacements in one or both lateral directions $D_1$, $D_2$.

Figure 7:
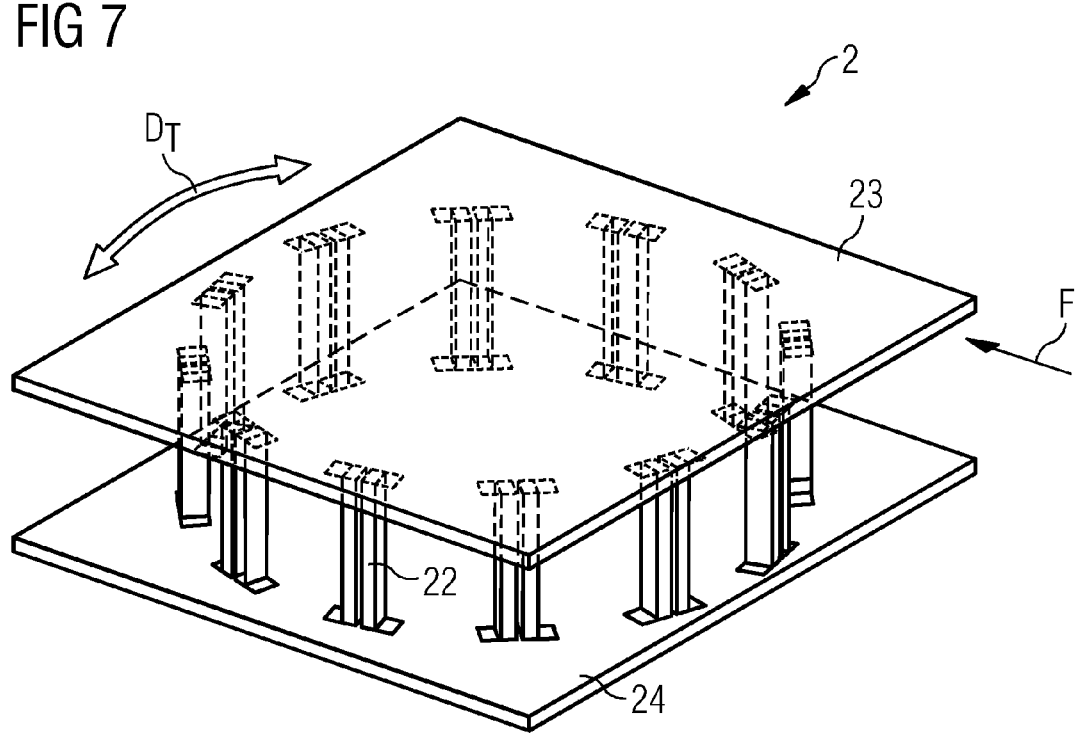
FIG. 7 shows an alternative embodiment of a tower model apparatus for use in a nacelle test apparatus of the invention.

FIG. 7 shows a circular arrangement of spring elements 22 of another embodiment of a tower model apparatus 2 of the test rig. Here, the spring elements 22 are arranged so that they can better model a torsional movement of the tower top. To simulate a torsional displacement $D_T$, indicated by the curved arrow, the test rig comprises a suitable exciter (not shown) that can displace the upper plate 23 of the test rig relative to the lower plate 24 by applying a force F at a suitable point. The torsional displacement $D_T$ is made possible by the lower tangential stiffness of the spring elements 22 (corresponding to direction X in FIG. 4). The displacement is also restricted to a torsional displacement on account of the high degree of radial stiffness (corresponding to direction Z in FIG. 4) of the spring elements 22. In this way, a "twisting" of the top of a wind turbine tower can be simulated in a rotational mode.

Clearly, using the test rig of the invention, the real-life working conditions of a wind turbine can be simulated very realistically, and before its actual construction. Furthermore, the exciters can be operated for any length of time at reasonably high speeds, so that side-effects of prolonged oscillation such as material fatigue can be detected in a relatively short time. In real life, it may take years for material fatigue to manifest. The test rig according to the invention allows such material fatigue to be identified very quickly, so that measures can be taken to avoid it. To this end, sensors and measuring devices for measuring stress and strain can be placed at appropriate points in or on the nacelle to measure the effects of the vibrations and loading when the exciter apparatus is activated. The frequency of vibration during a simulation is not limited to a real-life frequency, which is generally quite low, but can be increased so that reliable information can be collected in a relatively short period of time. For example, a simulation can be set up to run over a period of a few hours, a few days, or even a few weeks, simulating behaviour that would occur over a period of several months or even years.

The information collected in this way can be interpreted to determine any design corrections that should be carried out before actual construction of the wind turbine.

Although the present invention has been disclosed in the form of preferred embodiments and variations thereon, it will be understood that numerous additional modifications and variations could be made thereto without departing from the scope of the invention. For example, the test rig according to the invention can be used to test the effects of tower oscillation on any structure that is to be mounted on top of a high tower.

For the sake of clarity, it is to be understood that the use of "a" or "an" throughout this application does not exclude a plurality, and "comprising" does not exclude other steps or elements.

I claim:

1. A nacelle test apparatus for testing a wind turbine nacelle, comprising:
   a physical tower model apparatus realised to model the behaviour of a wind turbine tower; and
   a physical rotor model apparatus realised to model the behaviour of a wind turbine rotor, wherein the physical rotor model apparatus comprises a rotor hub exciter apparatus configured to model uneven or eccentric loading of a rotor, wherein the rotor hub exciter apparatus comprises a rotation mass mounted directly on a shaft; and
   a tower model exciter for exciting a physical tower model apparatus.

2. The nacelle test apparatus according to claim 1, wherein the tower exciter apparatus is realised to excite the physical tower model apparatus at a specific frequency or in a specific frequency range.

3. The nacelle test apparatus according to claim 1, wherein the physical tower model apparatus comprises a yaw interface realised for securing the nacelle to the physical tower model apparatus.

4. The nacelle test apparatus according to claim 3, wherein the yaw interface is realised to be adapted to a number of different nacelle designs.

5. The nacelle test apparatus according to claim 1, wherein the physical tower model apparatus comprises,
   a spring element arrangement realised to mimic spring characteristics of a wind turbine tower, and
   a tower exciter apparatus realised to excite the spring element arrangement.

6. The nacelle test apparatus according to claim 5, wherein the spring element arrangement comprises a plurality of upright spring elements.

7. The nacelle test apparatus according to claim 6, wherein a spring element is realised to comprise a high stiffness in a vertical direction and a low stiffness in a horizontal direction.

8. The nacelle test apparatus according to claim 6, wherein a spring element comprises a bundle of upright plates connected together.

9. The nacelle test apparatus according to claim 6, further comprising a horizontal mounting plate for connecting to the upright spring elements of the spring element arrangement, and
   wherein the tower exciter apparatus is realised to apply a lateral force to the horizontal mounting plate.

10. A method of testing a wind turbine nacelle, the method comprising:
    mounting the nacelle onto a physical tower model apparatus of a nacelle test apparatus, which physical tower model apparatus is realised to model the behaviour of a wind turbine tower; and
    mounting a physical rotor model apparatus of the nacelle test apparatus to a hub of the nacelle, which physical rotor model apparatus is realised to model the behaviour of a wind turbine rotor; and
    exciting the physical tower model apparatus and the physical rotor model apparatus, wherein exciting the physical rotor model apparatus comprises using a rotor hub exciter apparatus configured to model uneven or eccentric loading of a rotor, wherein the rotor hub exciter apparatus comprises a rotation mass mounted directly on a shaft.

11. The method according to claim 10, further comprising measuring a load exerted on a component in or on the nacelle as a result of an excitation of the physical tower model apparatus and the physical rotor model apparatus.

12. The method according to claim 10, wherein the exciting the physical tower model apparatus comprises inducing a vibration of the physical tower model apparatus in a specific direction.

13. The method according to claim 12, wherein the exciting the physical tower model apparatus comprises altering a direction of vibration of the physical tower model apparatus.

14. The method according to claim 12, further comprising yawing the nacelle while subjecting the physical tower model apparatus to excitations in a plurality of directions.

15. A method of testing a wind turbine nacelle, the method comprising:
    mounting the nacelle onto a physical tower model apparatus of a nacelle test apparatus, which physical tower model apparatus is realised to model the behaviour of a wind turbine tower; and
    mounting a physical rotor model apparatus of the nacelle test apparatus to a hub of the nacelle, which physical rotor model apparatus is realised to model the behaviour of a wind turbine rotor; and
    exciting the physical tower model apparatus and the physical rotor model apparatus, wherein exciting the physical rotor model apparatus comprises using a rotor hub exciter apparatus configured to model uneven or eccentric loading of a rotor, wherein the rotor hub exciter apparatus comprises a rotation mass mounted directly on a shaft and rotated in an eccentric manner using a drive belt.

16. The method according to claim 15, further comprising measuring a load exerted on a component in or on the nacelle as a result of an excitation of the physical tower model apparatus and the physical rotor model apparatus.

17. The method according to claim 15, wherein the exciting the physical tower model apparatus comprises inducing a vibration of the physical tower model apparatus in a specific direction.

18. The method according to claim 17, wherein the exciting the physical tower model apparatus comprises altering a direction of vibration of the physical tower model apparatus.

19. The method according to claim 17, further comprising yawing the nacelle while subjecting the physical tower model apparatus to excitations in a plurality of directions.

* * * * *